United States Patent
Schloesser et al.

(10) Patent No.: US 7,305,812 B2
(45) Date of Patent: Dec. 11, 2007

(54) DELEAFER APPARATUS AND METHOD

(75) Inventors: Christopher M. Schloesser, Hudson, WI (US); Shannon Arcand, Clayton, WI (US)

(73) Assignee: Oxbo International Corporation, Byron, NY (US)

( * ) Notice: Subject to any disclaimer, the term of this patent is extended or adjusted under 35 U.S.C. 154(b) by 277 days.

(21) Appl. No.: 11/043,435

(22) Filed: Jan. 25, 2005

(65) Prior Publication Data
US 2006/0162306 A1  Jul. 27, 2006

(51) Int. Cl.
*A01D 34/73* (2006.01)

(52) U.S. Cl. .............................. 56/235; 56/230; 56/330

(58) Field of Classification Search ................. 56/12.8, 56/12.9, 13.1, 13.3, 100, 233, 235, 330
See application file for complete search history.

(56) References Cited

U.S. PATENT DOCUMENTS

| | | | |
|---|---|---|---|
| 2,929,188 A * | 3/1960 | Talkington, Sr. ................ | 56/30 |
| 3,754,382 A | 8/1973 | Rakestraw | |
| 4,183,471 A | 1/1980 | Pfister | |
| 4,896,486 A | 1/1990 | Lundahl et al. | |
| 5,111,645 A | 5/1992 | Klinner | |
| 6,594,982 B1 | 7/2003 | Collard | |
| 6,834,487 B2 | 12/2004 | Pellenc et al. | |
| 2005/0081501 A1 | 4/2005 | Pellenc | |

FOREIGN PATENT DOCUMENTS

| | | |
|---|---|---|
| DE | 29 31 564 | 2/1981 |
| EP | 0 278 607 A1 | 8/1988 |
| EP | 0 597 253 A1 | 5/1994 |
| FR | 2 417 932 | 9/1979 |
| FR | 2 483 168 | 12/1981 |

OTHER PUBLICATIONS

Brochure "Intello 2000 Deleafer Innovation in the Service of Nature", 1 page (Date: Publicly known prior to the filing date of the present application).

Brochure "Clemens The way for the Sun Leaf Remover", 2 pgs (Date: Publicly known prior to the filing date of the present application).

(Continued)

*Primary Examiner*—Thomas B. Will
*Assistant Examiner*—Alicia Torres
(74) *Attorney, Agent, or Firm*—Merchant & Gould P.C.

(57) ABSTRACT

A deleafer apparatus including a drum assembly partially enclosed by a shroud. A rotating blade assembly is located within an interior volume of the drum assembly. An air circulation device, located beneath the drum assembly, draws air through an opening defined by the shroud and into the interior volume of the drum assembly. In use, the deleafer apparatus is carried by a transport in a direction of travel along a row of plants or vines. The rotating blade assembly strips leaves that extend into the interior volume of the drum assembly from the plants or vines. The deleafer apparatus also includes a break-away mechanism that permits a portion of the deleafer apparatus to rotate outward relative to a transport mounting to accommodate obstacles that may reside in the pathway of the plants or vines.

38 Claims, 12 Drawing Sheets

OTHER PUBLICATIONS

Brochure "Effeuilleuse ERO", 2 pgs, double-sided (Date: Publicly known prior to the filing date of the present application).

Brochure and webpage printout "A VIDOR Leaf Removal Systems for Viticulture", 5 pgs. (Date: Publicly known prior to the filing date of the present application).

Brochure "The Columbia Leaf Removers", 2 pages. (Date: Publicly known prior to the filing date of the present application).

VBC Viticulture Equipment advertisement found in Vineyard & Winery Management, 1 page (Jan./Feb. 2005).

Webpage printout Leaves-Cleaner D Type, 2 pages. (Date: Publicly known prior to the filing date of the present application).

Screen from Belarus Web Site, www.Belarus.net, *Stripping Technology*, 2 pages, Apr. 13, 2004.

Screen from Belarus Web Site, www.Belarus.net, *Three Main Principles of the new Technology*, 2 pages, Apr. 13, 2004.

Screen from Belarus Web Site, www.Belarus.net, *Developed Machines*, 1 page, Apr. 13, 2004.

Screen from Belarus Web Site, www.Belarus.net, *How the Stripper Operates*, 1 page, Apr. 13, 2004.

Brochure "Collard Raptor Leaf Remover", 2 pages (Date: Publicly known prior to the filing date of the present application).

Brochure "TORDABLE Nouvelle effeuilleuse Intello double tete", 2 pages (Date: Publicly known prior to the filing date of the present application).

Brochure "PELLENC Aussi bien qu'a la main", 4 pages (Date: Publicly known prior to the filing date of the present application).

Brochure "TORDABLE l'innovation au service de la nature", 8 pages (Date: Publicly known prior to the filing date of the present application).

\* cited by examiner

DELEAFER APPARATUS AND METHOD

TECHNICAL FIELD

This disclosure relates generally to methods and devices for the removal of leaves from vegetation. More particularly, this disclosure relates to an apparatus for stripping leaves from plants or vines, and associated deleafing methods.

BACKGROUND

Leaf stripping is a process of removing leaves from plants or vines to enhance and optimize fruit quality and harvesting processes. The wine industry is one example of an industry that employs the leaf stripping process. Stripping leaves from grape vines, for example, thins the foliage coverage of the grape vines. Some of the benefits in thinning the foliage coverage of grape vines include: reducing rot by facilitating drying through better sun exposure and better aeration; improving red grape coloration and grape ripening through better sun exposure; providing better penetration of treatments; and providing access to the grape bunches to reduce labor and time associated with grape bunch thinning and grape harvesting operations.

A wide variety of arrangements have been utilized for stripping leaves from plants or vines. In general, improvement has been sought with respect to conventional devices and systems of leaf stripping, generally to better accommodate: ease of use, efficiency of the deleafing process; reduced plant or vine damage, and, adaptability in varying applications.

SUMMARY

The present invention relates to a deleafer apparatus. The deleafer apparatus includes a frame having a shroud, a drum assembly, a blade assembly, and an air circulation device. The blade assembly is mounted within an interior volume of the drum assembly, and is configured to rotate about an axis of rotation. The air circulation device is located relative to the drum assembly to draw air through openings in a sidewall of the drum. In use, the deleafer apparatus is carried by a transport in a direction of travel along a row of plants or vines. The blade assembly strips the leaves of the plants or vines that extend into the interior volume of the drum assembly. The deleafer apparatus also includes a break-away mechanism that permits a portion of the deleafer apparatus to rotate outward to accommodate obstacles that may reside in the pathway of the plants or vines.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present invention that are illustrated in the accompanying drawings. Wherever possible, the same reference numbers will be used throughout the drawings to refer to the same or like parts.

FIGS. 1-12 illustrate a deleafer apparatus 10 having features that are examples of how inventive aspects in accordance with the principles of the present disclosure may be practiced. Preferred features are adapted for enhancing and optimizing fruit quality and harvest processes. The apparatus of the present disclosure is particularly useful in enhancing vineyard processes and optimizing grape quality. Although the preferred embodiments are hereinafter described in relation to use on vines and grape harvesting, the disclosed apparatus and methods can be used for other fruit harvesting and plant or vine management.

Figure 7:
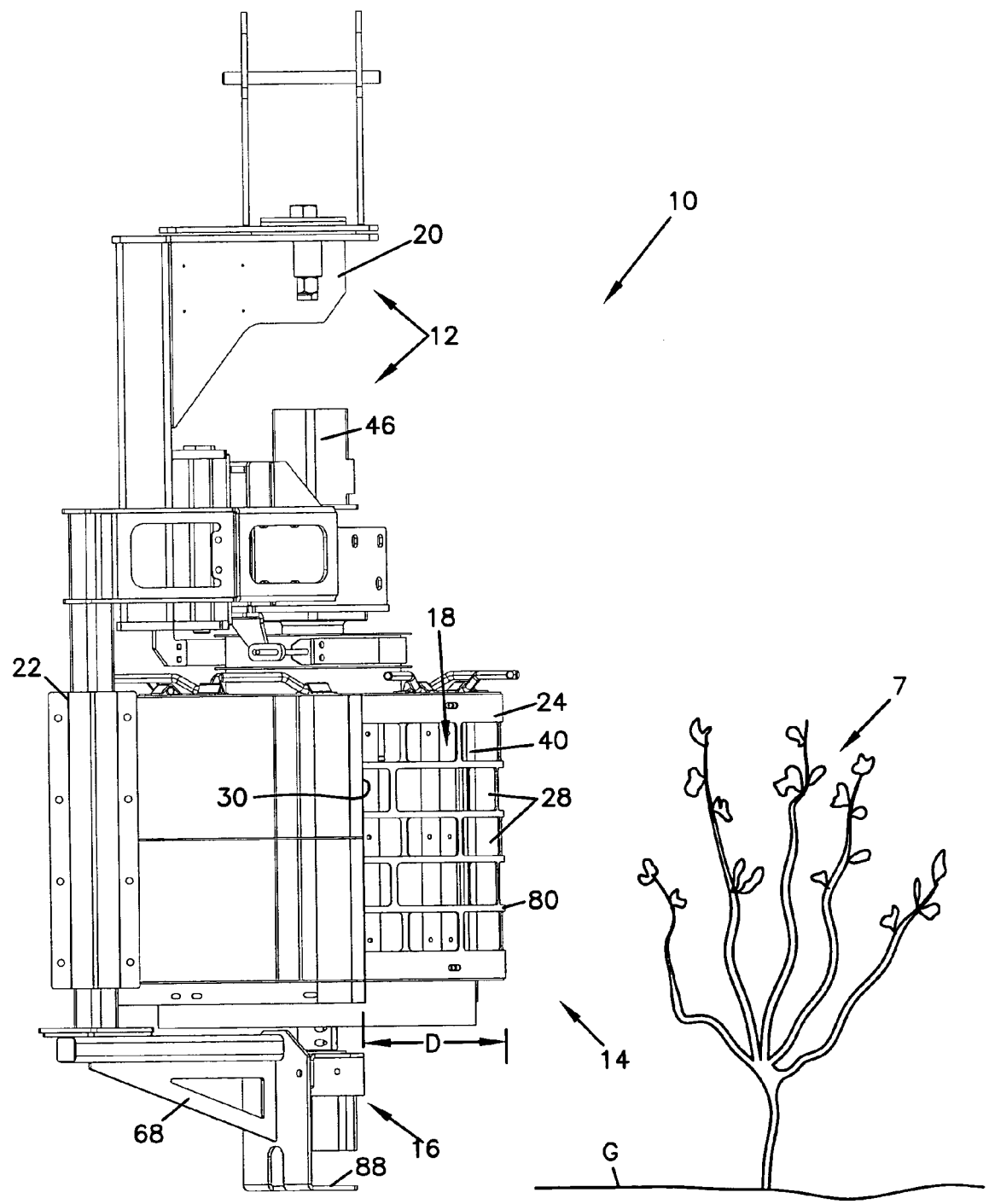
FIG. 7 is a front elevation view of the deleafer apparatus of FIG. 1.
Figure 8:
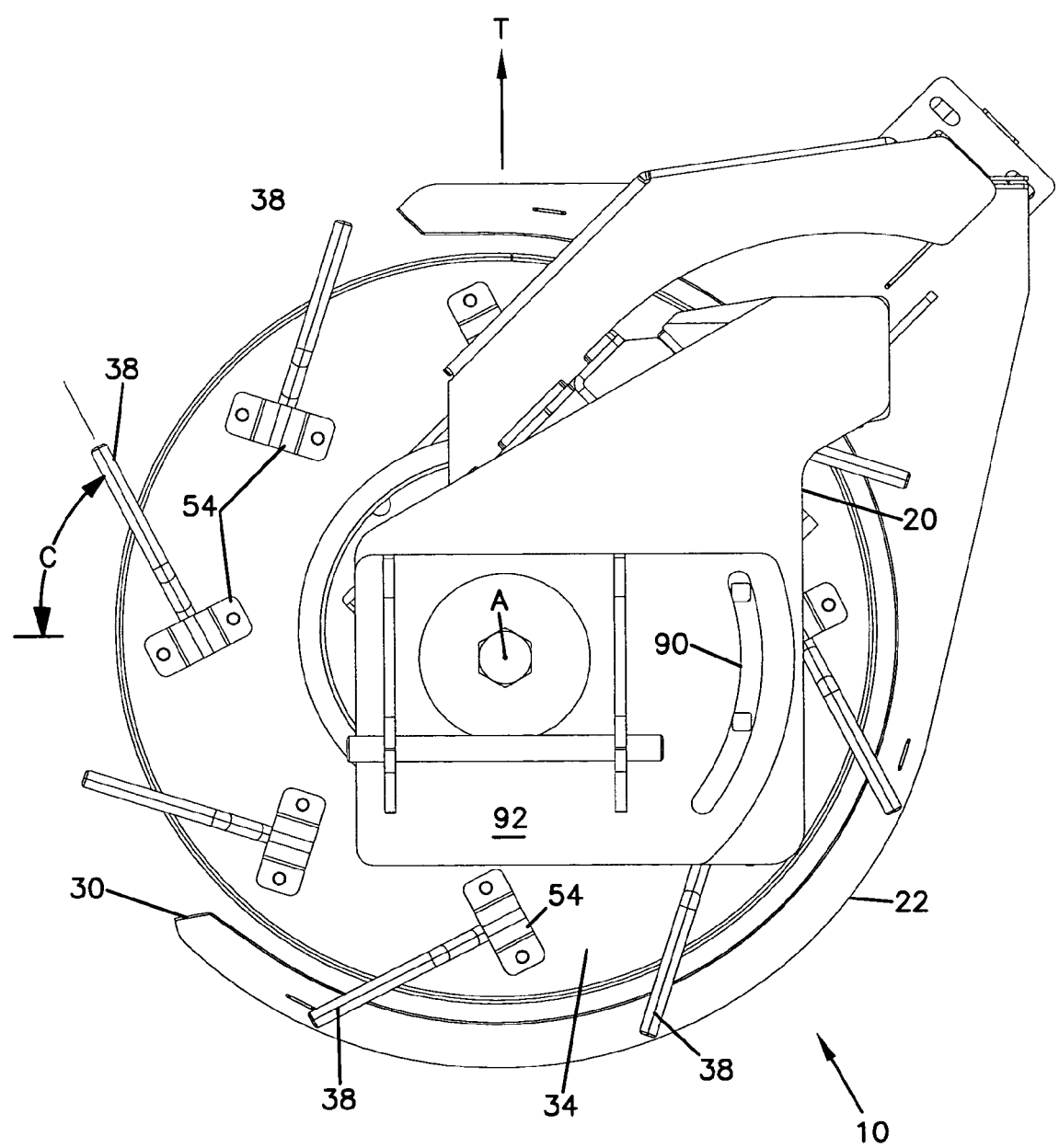
FIG. 8 is a top plan view of the deleafer apparatus of FIG. 1.
Figure 9:
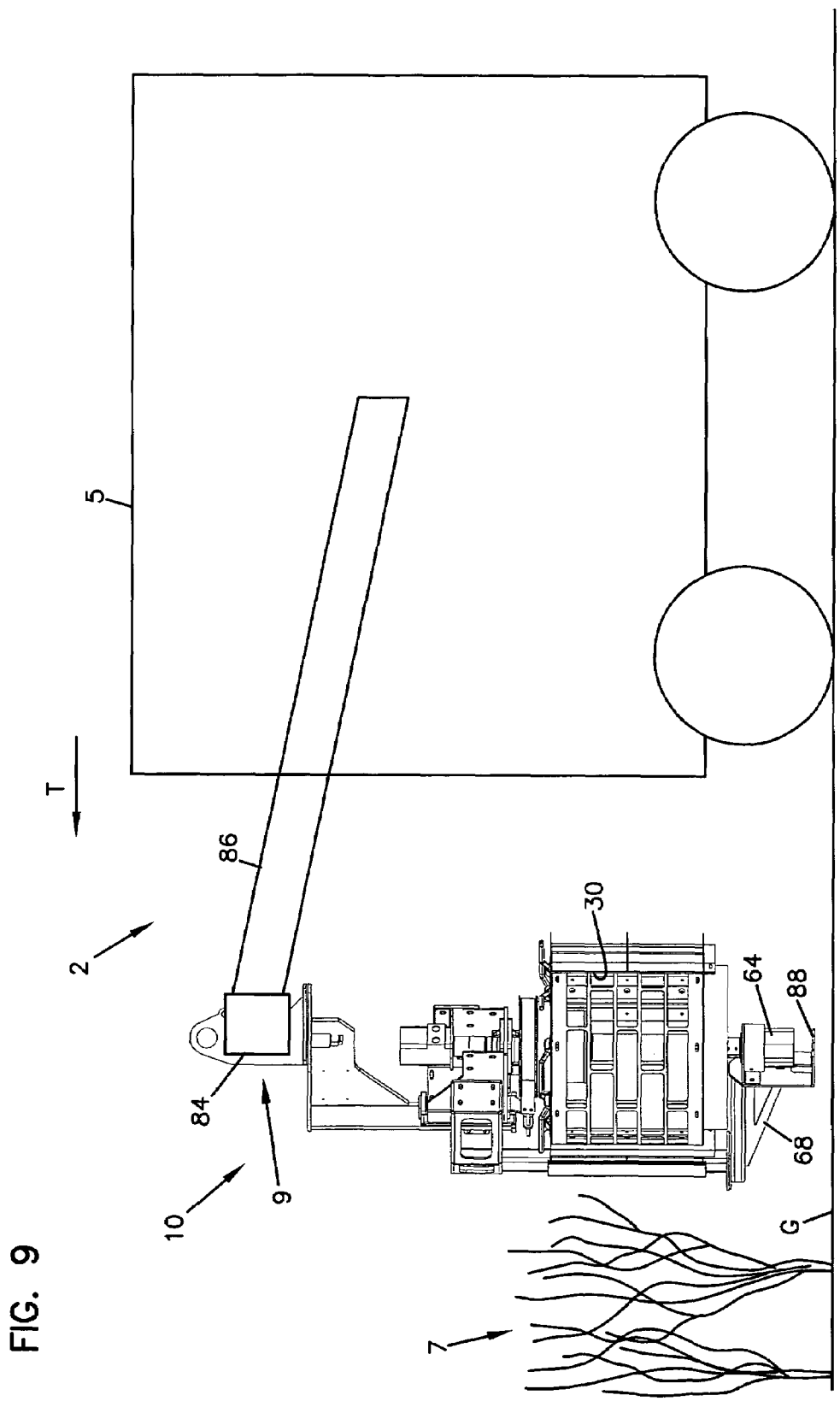
FIG. 9 is a side elevation view of one embodiment of a deleafing system including the deleafer apparatus of FIG. 1 coupled to a schematically represented transport.

The deleafer apparatus 10 illustrated in FIGS. 1-8 is one embodiment of the present invention that can be used with a deleafing system 2 shown in FIGS. 9-12. Referring to FIG. 9, the deleafing system 2 generally includes the deleafer apparatus 10 and a transport 5. The transport can include a vehicle, tractor, or other piece of equipment capable of travel in at least a first direction T. In use, the deleafer apparatus 10 is carried by the transport 5 along a row of vines 7, for example. As the deleafer apparatus 10 moves along the row of vines 7, leaves are stripped or removed from the vines 7 to thin the foliage coverage.

Figure 1:
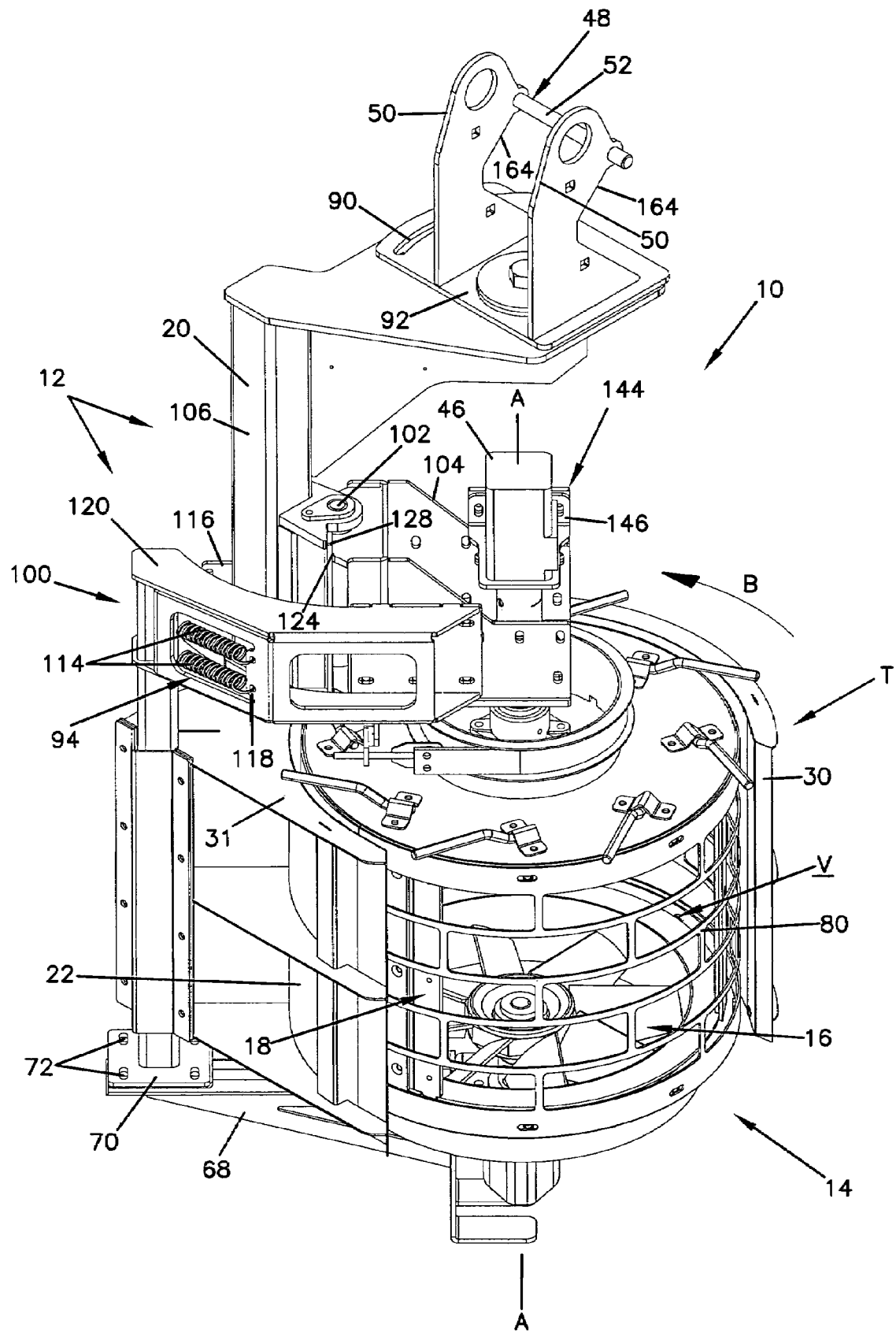
FIG. 1 is a top perspective view of a deleafer apparatus according to the principles of the present disclosure, showing an open side of the deleafer apparatus.
Figure 2:
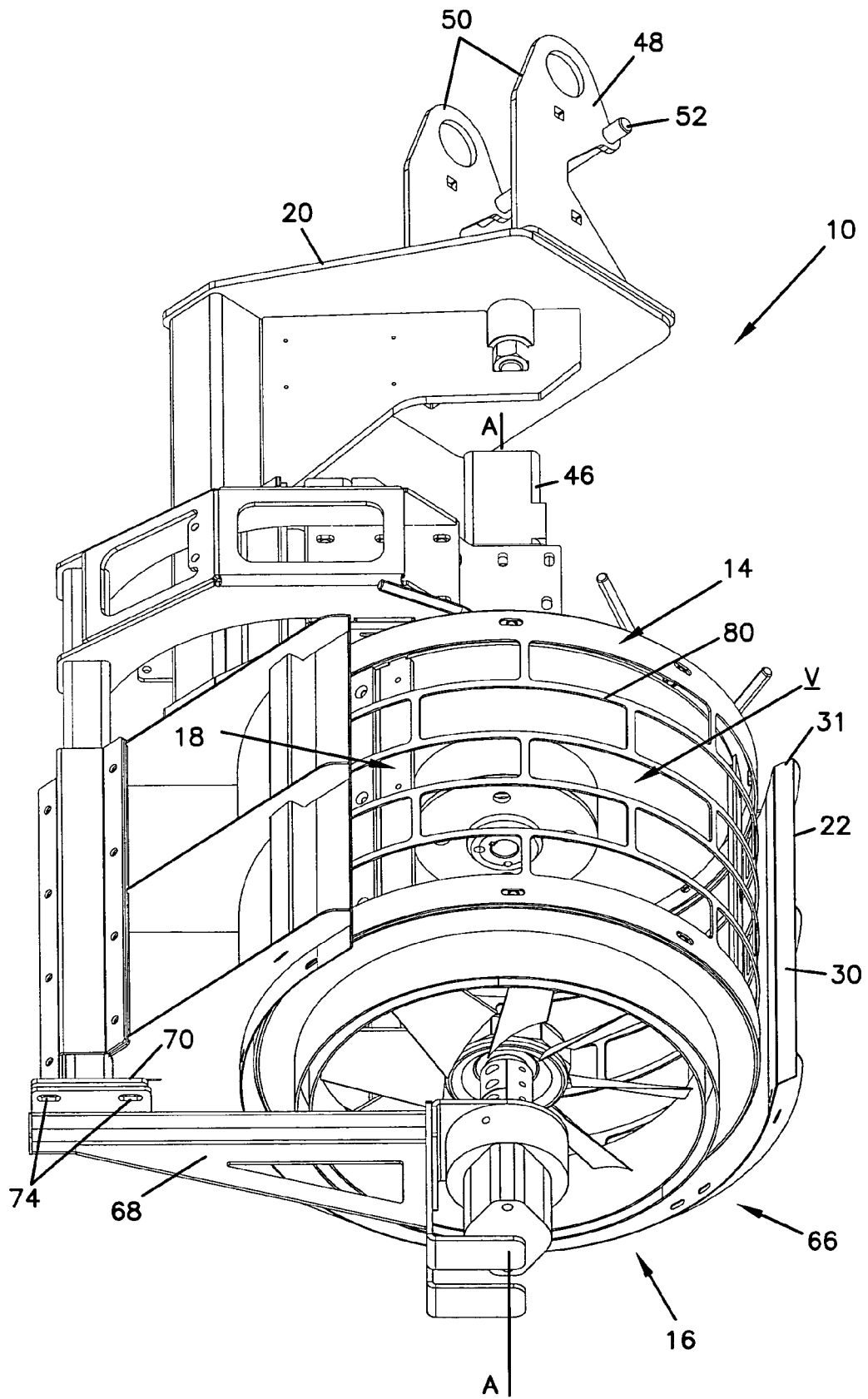
FIG. 2 is a bottom perspective view of the deleafer apparatus of FIG. 1.

Referring to FIG. 1, the deleafer apparatus 10 generally includes a drum assembly 14, a blade assembly 18, and an air circulation device 16 (see also FIG. 2). During operation, the drum assembly 14 engages the vines 7; the blade assembly 18 removes leaves from the vines; and the air circulation device 16 aids in drawing the vines toward the drum assembly 14, and expelling the stripped leaves. Each of the drum assembly 14, the blade assembly 18, and the air circulation device 16 is interconnected to a frame assembly 12. The frame assembly 12 couples the deleafer apparatus 10 to the transport 5.

The frame assembly 12 includes a primary mounting bracket 20 having a mounting connection 48 that couples with a corresponding connection 9 of the transport 5. The primary mounting bracket 20 is constructed such that the deleafer apparatus 10 is carried by the transport 5 in a generally vertical orientation as shown in FIGS. 9-12. Referring still to FIG. 1, the frame assembly 12 also includes a drum housing 22 and an intermediary bracket 104. The intermediary bracket 104 interconnects the drum housing 22 to the primary mounting bracket 20.

Figure 10:
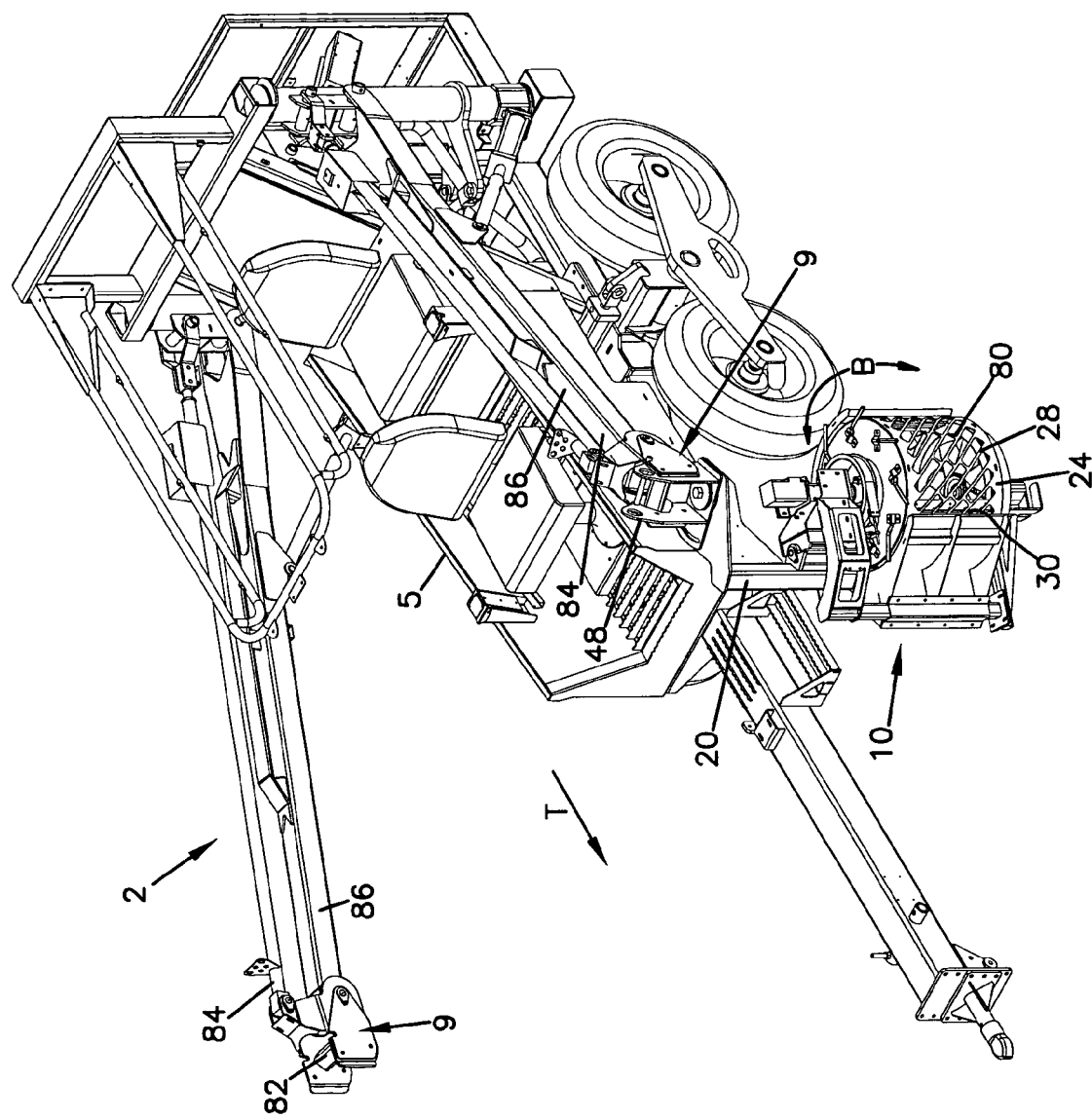
FIG. 10 is a top perspective view of another deleafing system including one embodiment of a transport carrying the deleafer apparatus of FIG. 1, the deleafer apparatus including an alternative drum assembly.
Figure 11:
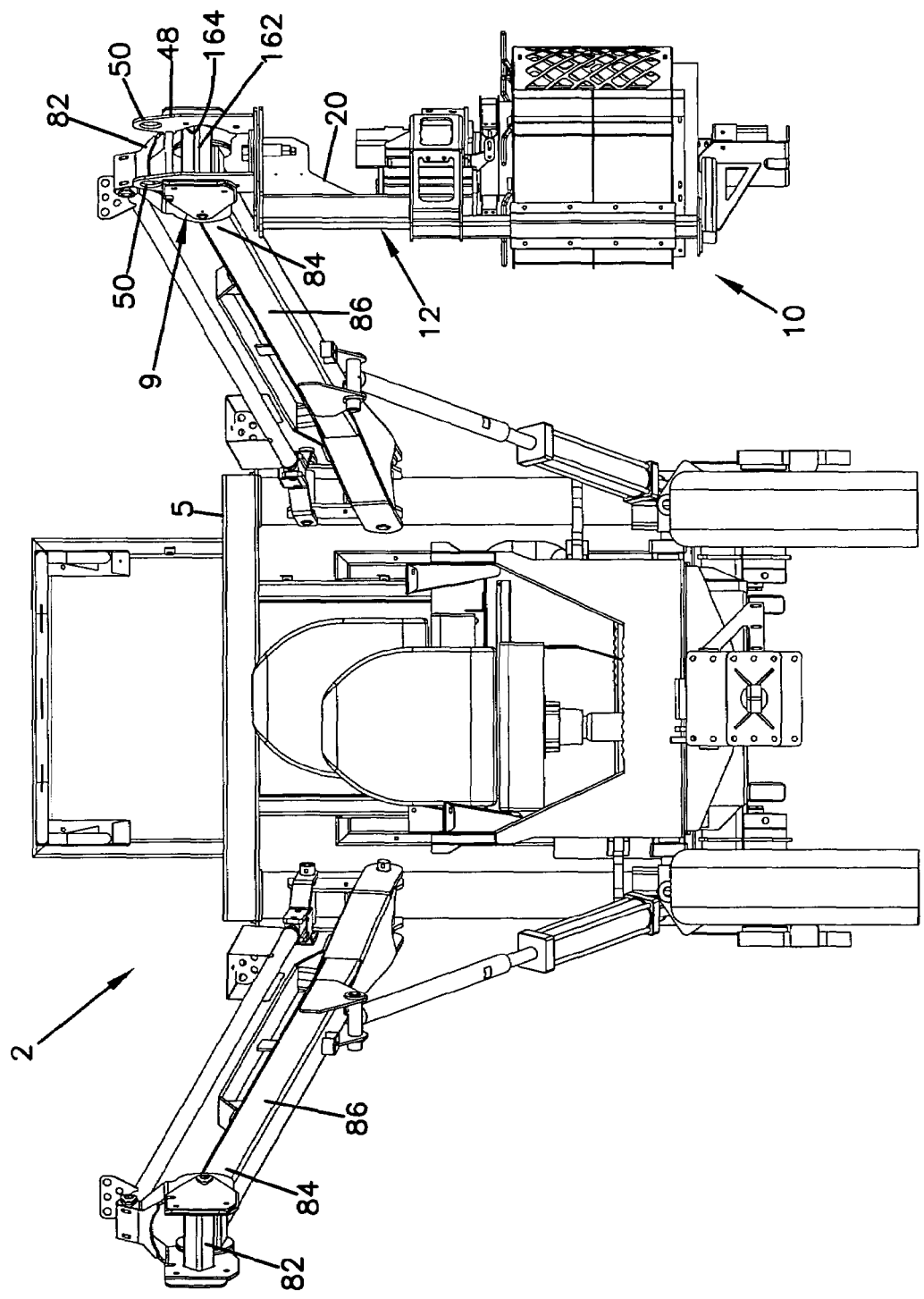
FIG. 11 is a front elevation view of the deleafing system of FIG. 10.
Figure 12:
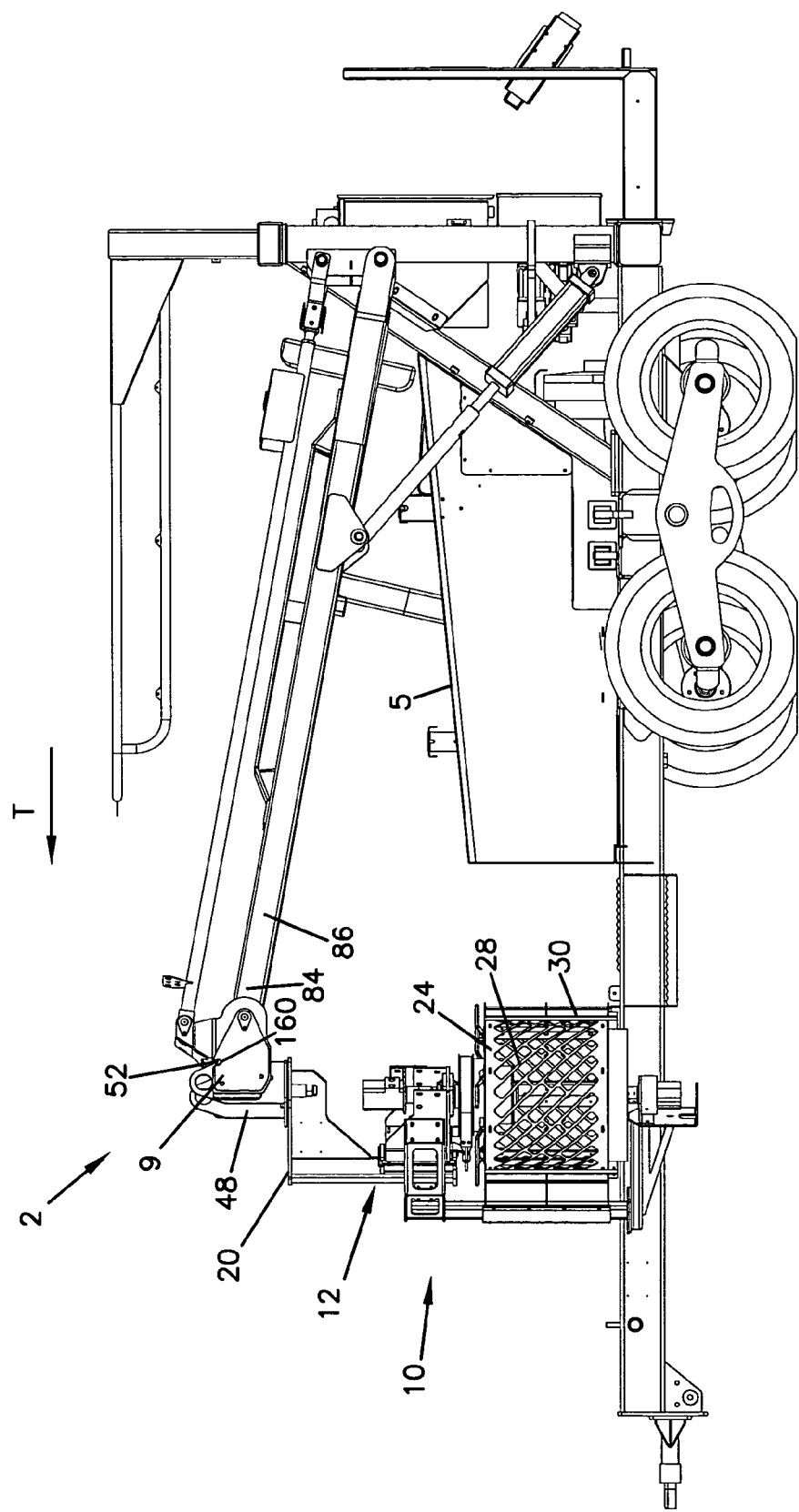
FIG. 12 is a side elevation view of the deleafing system of FIG. 11.

In the illustrated embodiment of FIG. 1, the mounting connection 48 includes two brackets 50 mounted to a base 92, and a rod 52 extending between the two brackets 50. Referring to FIGS. 10-12, the corresponding connection 9 includes a quick-connect coupler 82 (FIGS. 10 and 11) located at an end 84 of a boom or arm 86. A rigid connection is provided between the deleafer apparatus 10 and the transport 5 when the rod 52 of the mounting connection 48 engages notches 160 (FIG. 12) of the quick-connect coupler 82, and a stabilizing bar 162 (FIG. 11) of the quick-connect coupler 82 engages notches 164 formed in each of the brackets 50.

Referring back to FIGS. 9-12, during use, the transport 5 carries the deleafer apparatus 10 such that a housing opening 30 of the deleafer apparatus 10 faces the row of vines 7. In the illustrated embodiment of FIGS. 10-12, the deleafer apparatus 10 can be carried on either the left or right arm 86 of the transport 5, depending upon the application. In other applications, two deleafer apparatuses can be carried by each of the arms for use in stripping leaves from two rows of vines, or in stripping leaves from both sides of a single row of vines. The transport 5 and deleafer apparatus(es) 10 move in the direction of travel T along the row of vines while maintaining the orientation of the housing opening 30 relative to the vines 7.

Figure 3:
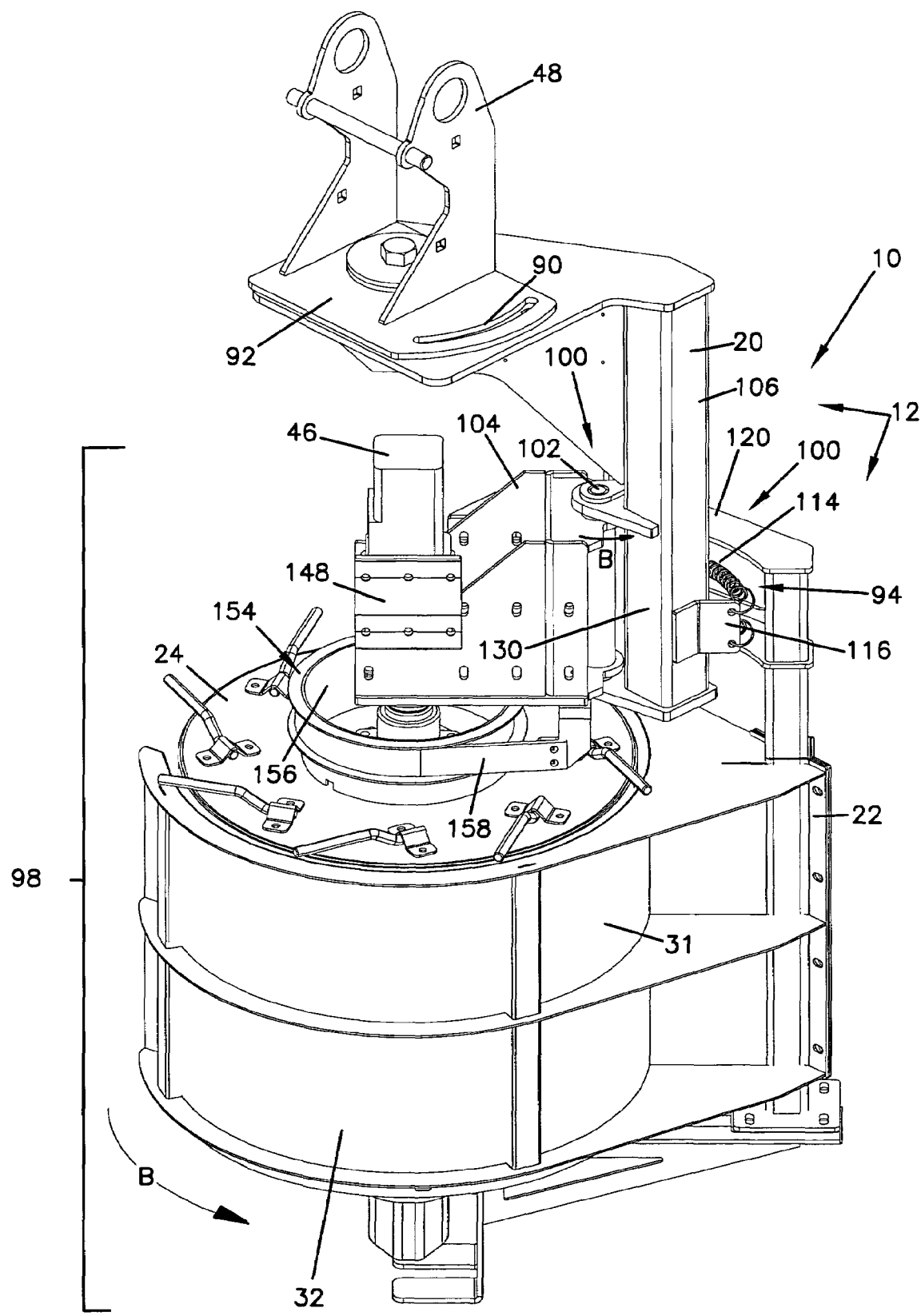
FIG. 3 is top perspective view of the deleafer apparatus of FIG. 1, showing an enclosed side of the deleafer appartus.

Referring now to FIG. 3, the mounting connection 48 of the frame assembly 12 is preferably adjustable so that the deleafer apparatus 10 can be used in different applications having, for example, varied row widths. In the illustrated embodiment, the base 92 of the mounting connection 48 includes a slot 90. The slot 90 is configured to receive a bolt (not shown), which is also received by the corresponding connection 9 of the transport 5. In use, an operator can selectively orient or align the deleafer apparatus 10 relative to the transport 5 by moving the deleafer apparatus 10 so that the bolt slides within the slot 90. The bolt is then tightened to rigidly secure the deleafer apparatus 10 in the desired orientation.

Figure 4:
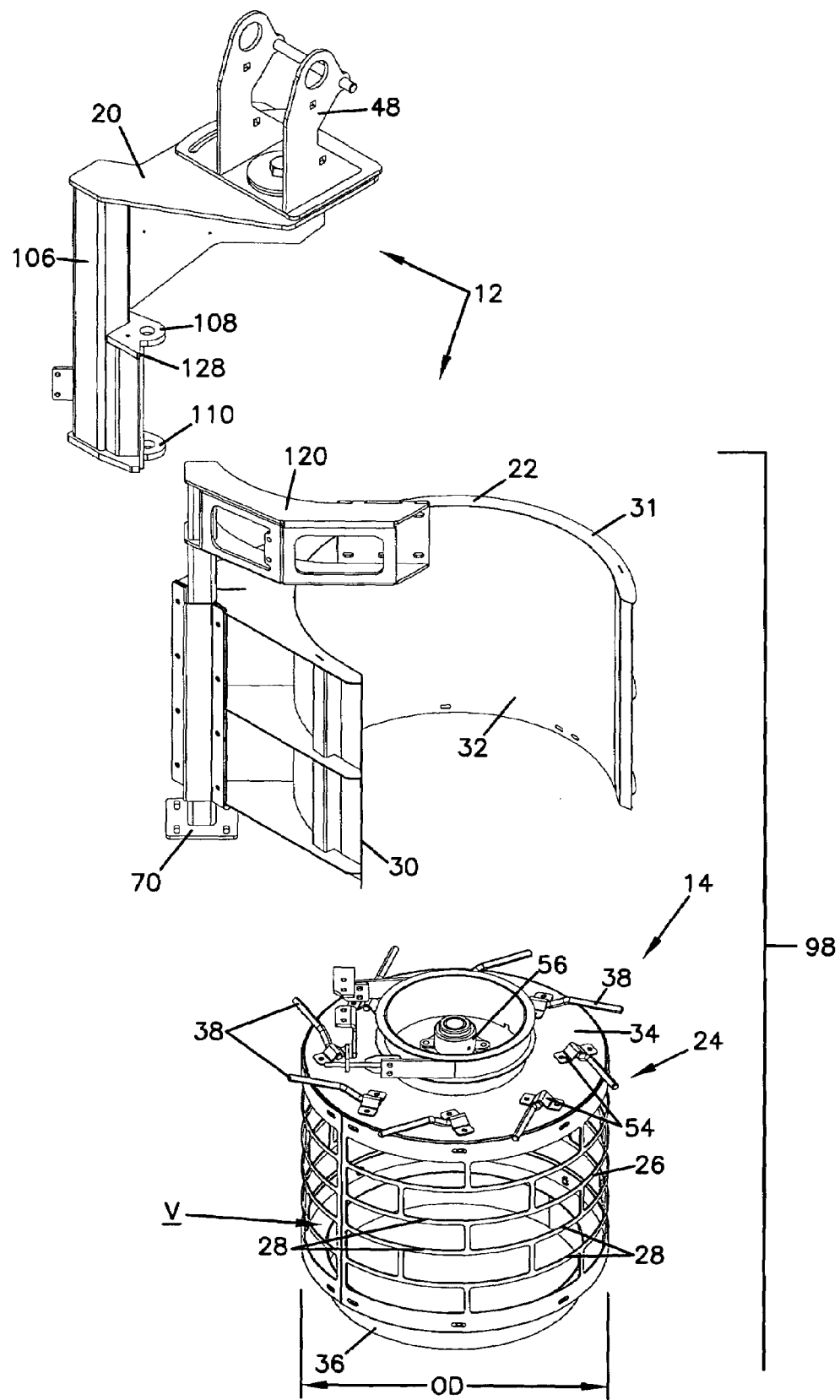
FIG. 4 is an exploded perspective view of a frame assembly and a drum assembly of the deleafer apparatus of FIG. 1.
Figure 5:
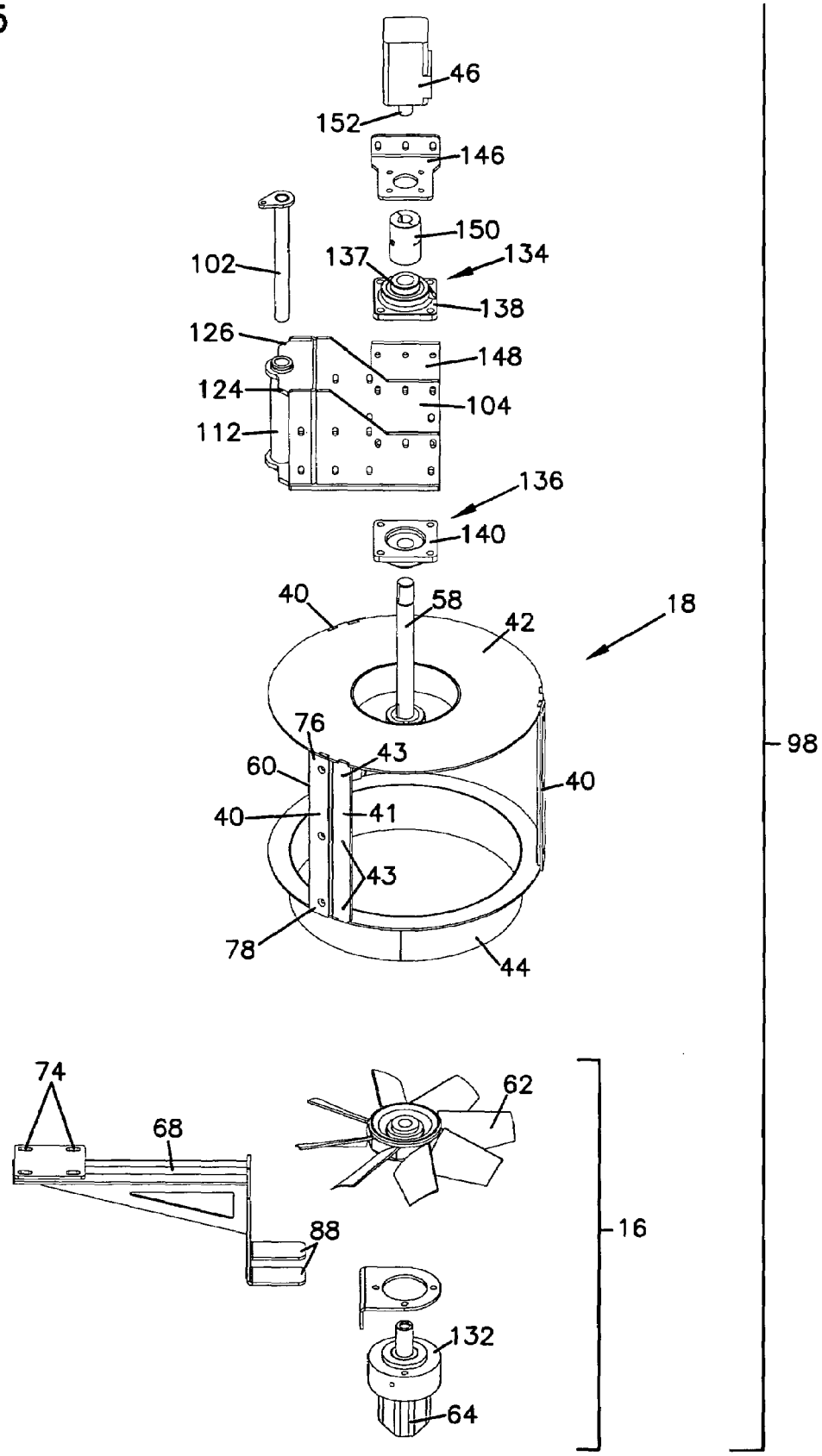
FIG. 5 is an exploded perspective view of a blade assembly and an air circulation device of the deleafer apparatus of FIG. 1.

Still referring to FIG. 3, the deleafer apparatus 10 of the present disclosure preferably includes a break-away feature 100. Generally, the break-away feature 100 includes a spring arrangement 94 and a shaft or pin 102 interconnected to the intermediary bracket 104 of the frame assembly 12. The break-away feature 100 permits a lower portion 98 of the deleafer apparatus 10 to pivot relative to the primary mounting bracket 20 of the deleafer apparatus. As shown in FIGS. 4 and 5, the lower portion 98 of the deleafer apparatus 10 includes, for example, the drum housing 22, the drum assembly 14, the blade assembly 18, and the air circulation device 16. In the event the deleafer apparatus 10 becomes entangled with the vines 7, or runs into an obstruction, the lower portion 98 of the deleafer apparatus 10 swings or pivots about the pin 102 (as shown by arrows B in FIGS. 1, 3 and 10). This prevents damage to the transport 5 and the deleafer apparatus 10 that may otherwise result from a strictly rigid interconnection.

Referring now to FIGS. 4 and 5, the break-away pin 102 of the deleafer apparatus 10 pivotally couples the intermediary bracket 104 to a main post member 106 of the primary mounting bracket 20. In particular, the intermediary bracket 104 includes a cylindrical sleeve 112 (FIG. 5). The cylindrical sleeve 112 is positioned between upper and lower flanges 108, 110 (FIG. 4) that are coupled to the main post member 106. The break-away pin 102 extends through the flanges 108, 110 and the cylindrical sleeve 112 to provide a hinge-type joint between the intermediary bracket 104 and the primary mounting bracket 20.

Referring back to FIG. 1, the spring arrangement 94 of the break-away feature 100 includes two springs 114 coupled to first and second spring anchors 116, 118. The first spring anchor 116 (FIG. 3) is attached to the main post member 106, and the spring anchor 118 (FIG. 1) is formed in a lever arm 120 of the drum housing 22. The springs 114 are arranged to provide a tension force that positions the lower portion 98 of the deleafer apparatus 10 in a first engagement position relative to the primary mounting bracket 20, as shown in FIG. 1. The first engagement position of the deleafer apparatus 10 in relation to the transport 5 is the position at which the front opening 30 of the deleafer apparatus 10 faces the row of vines 7 (as shown in FIG. 7). When a torsional force sufficient to overcome the spring tension force is applied to the lower portion 98, the lower portion 98 swings or pivots outward to a break-away position (not shown) to accommodate passage of the obstacle, or to signal to the operator the presence of an entanglement. When the obstacle has passed or the entanglement has been cleared, the springs 114 bias the lower portion 98 of the deleafer apparatus 10 back to the first engagement position.

In the illustrated embodiment, first and second shoulder stops 124, 126 (FIG. 5) are formed in the intermediary bracket 104. The first shoulder stop 124 contacts an extension 128 (FIGS. 1 and 4) of the primary mounting bracket 20 to limit rotation of the lower portion 98 of the deleafer apparatus 10 beyond the engagement position in a first direction. The second shoulder stop 126 (FIG. 5) contacts a surface 130 (FIG. 3) of the main post member 106 to limit rotation of the lower portion 98 of the deleafer apparatus beyond a maximum break-away position in a second opposite direction (i.e., the direction represented by arrows B).

Referring back to FIG. 3, the drum housing 22 of the frame assembly 12 includes a guard structure or shroud 31. The shroud 31 includes a curved wall 32 that wraps around the drum assembly 14. The shroud 31 defines the housing opening 30 (FIG. 1) of the deleafer apparatus 10. As shown in FIGS. 1 and 4, the lever arm 120 of the drum housing 22 interconnects the shroud 31 with the intermediary bracket 104, which in turn, couples to the primary mounting bracket 20, as previously described.

The overall operation of the deleafer apparatus involves mounting the deleafer apparatus 10 as previously described to a transport 5. The deleafer apparatus 10 is then carried by the transport 5 in a direction of travel T along the row of vines. Air is drawn into the drum assembly 14 of the apparatus 10 through the housing opening 30 by the air circulation device 16. The suction of air through the housing opening 30 aids in drawing leaves from the vines toward an interior volume V of the drum assembly 14. Although air flow generated by the air circulation device 16 assists in drawing leaves into the drum assembly 14, depth of engagement of the drum assembly also determines the percentage of foliage removal. That is, operation of the air circulation device 16 in combination with the depth of engagement of the drum assembly 14 determines the percentage of foliage removal.

More specifically, and in reference to FIG. 7, the deleafer apparatus 10 of the present disclosure has an arcuate exposed face 80. The exposed face 80 is the portion of the drum assembly 14 exposed through the front opening 30 of the deleafer apparatus 10. During use, the operator positions the housing opening 30 relative to the row of vines 7 such that the exposed face 80 of the deleafer apparatus engages the plants or vines 7 at a selected depth. Varying the selected depth of engagement of the exposed face 80 of the deleafer apparatus 10 correspondingly varies the percentage of foliage removal.

For instance, the exposed face 80 of the deleafer apparatus 10 extends outward from the front opening 30 a distance or depth D. In FIG. 7, the exposed face 80 is not engaged with the row of vines 7, however, as can be understood, the depth of engagement with the vines 7 can range between minimal engagement and an engagement depth equivalent to the depth D of the exposed face 80. As an example, the exposed face 80 may be selectively positioned to engage the vines 7 at a depth of approximately two inches to thin only the outermost foliage coverage. In contrast, the exposed face 80 may be selectively positioned to engage the vines at a depth of approximately six inches to obtain deeper foliage removal. In the illustrated embodiment, the depth D of the exposed face 80, and accordingly the depth of engagement with the plants or vines is preferably between 1 and 12 inches; more preferably between about 2 and 6 inches.

Referring again to FIG. 4, the drum assembly 14 of the present invention includes a cage or drum 24. The drum 24 has a sidewall 26 that defines an outer diameter OD of the drum 24. The sidewall 26 extends between a top portion 34 and a bottom portion 36 of the drum 24. The bottom portion 36 of the drum is open. The outer diameter OD of the drum 24 is sized to fit within the shroud 31 of the drum housing 22.

Openings 28 are formed in the sidewall 26 of the drum 24. In the illustrated embodiment of FIG. 1-9, each of the openings 28 has a rectangular configuration that defines an alternating pattern of side-by-side rectangular openings. In an alternative configuration shown in FIG. 10-12, the openings 28 of the drum 24 define a pattern of diagonal side-by-side rectangular openings. Other opening configurations and patterns can be used. Preferably, the openings 28 are sized to accommodate leaves of a particular size, depending upon the application and use of the deleafer apparatus 10.

The drum housing 22 of the frame assembly 12 is constructed to surround a portion of the sidewall 26 of the drum 24 so that operation of the air circulation device 16 is optimized. Preferably, the shroud 31 of the drum housing 22 surrounds a majority of the sidewall 26 (i.e. a majority of the circumference of the drum 24) to streamline the flow of air through an exposed number of openings 28 in the drum 24. Without the shroud 31, air flow would be drawn in around the entire circumference of the drum 24, thereby reducing flow and air suction directed at the plants or vines adjacent the housing opening 30.

Still referring to FIG. 4, a bearing 56 is coupled to the top portion 34 of the drum 24. The bearing 56 mounts to a drive shaft 58 (FIG. 5), which in turn couples to a motor 46. The bearing 56 permits the drum 24 to freely rotate about an axis of rotation A (FIG. 1) during operation of the deleafer apparatus 10; that is, the drum 24 rotates independent of the motor 46 and the blade assembly 18, and is not powered or driven by the drive shaft 58 or the motor 46.

Referring now to FIG. 8, the drum assembly 14 includes a plurality of rods 38 secured to the top portion 34 of the drum 24 by brackets 54. The rods 38 extend outward beyond the outer diameter OD of the drum 24 to engage the plants or vines 7. In the illustrated embodiment, the rods 38 are angled at an angle C relative to line perpendicular to a tangent of the outer diameter OD of the drum 24. Preferably, the angle C is between 40 and 80 degrees; more preferably between about 55 and 65 degrees.

As the transport 5 moves along a row of vines 7 in the direction of travel T, the angled rods 38 engage the vines 7. The angle C of the rods 38 is designed so that each of the rods 38 positively engages with the vines 7, while also retracting from the vines without causing damage. Engagement of the rods 38 with the vines 7 causes the drum 24 to rotate at a rotational speed corresponding to the linear speed of the transport 5. By permitting the drum 24 to freely rotate at a speed corresponding to the speed of the transport 5, the exposed face 80 of the drum assembly is essentially stationary relative to a point of engagement of the vines 7. In other words, the engagement of the rods 38 causes the exposed face 80 of the drum 24 "walk" along the row rather than sliding across the row. If the drum 24 did not freely rotate, but instead was stationary (or rotated at a rotational speed not corresponding to the linear speed of travel), the exposed face 80 would simply slide along the vines as the transport 5 traveled along the row. By designing the drum 24 to walk along the row (i.e. freely rotate), the leaves on the vines 7 are permitted to feed into the openings 28 of the drum 24, rather than simply slide across the exposed face 80 of the drum. Designing the drum 24 to walk along the row rather than slide across the row also reduces damage to the vines or plants.

Referring again to FIG. 1, the blade assembly 18 of the deleafer apparatus 10 is mounted within the interior volume V of the drum assembly 14. The blade assembly 18 rotates about the axis of rotation A to strip leaves from vines extending into the interior volume V of the drum assembly 14.

Referring to FIG. 5, the blade assembly 18 includes blades 40 mounted between upper and lower plates 42, 44. In the illustrated embodiment, three blades 40 are provided; although other embodiments may include a different number and different configuration of blades. Also, the three blades 40 of the blade assembly 18 are mounted at generally equal intervals about the circumference of the upper and lower plates 42, 44; although other placements or arrangements can be used. As shown in FIG. 1, the blades 40 vertically extend in a direction generally parallel to the axis of rotation A when mounted within the drum assembly 14.

In the illustrated embodiment, the blades 40 are fastened to a support bracket 41 that provides structural stability to the overall construction the blade assembly 18. The support bracket 41 has two columns of holes 43 located on right and left sides of the bracket 41 (only the right side column of holes shown). The blades 40 can be mounted to either the right side or the left side of the bracket 41 for operation in either the clockwise or counterclockwise direction. Preferably, the blades 40 are removeably mounted to the support bracket 41 by fasteners, for example (fasteners not shown). This permits an operator to easily replace worn or damaged blades 40 without having to replace the entire blade assembly 18.

Figure 6:
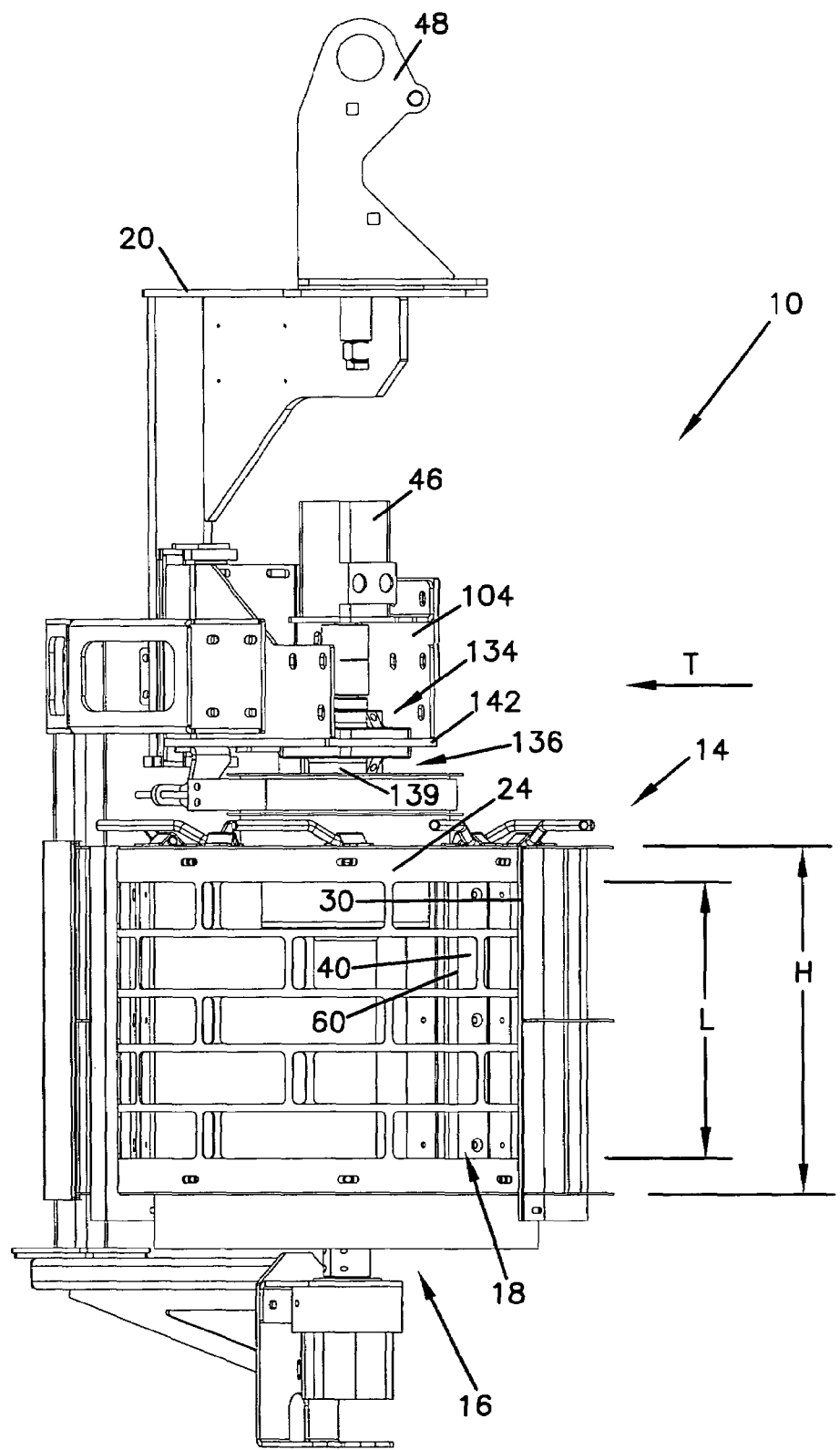
FIG. 6 is a side elevation view of the deleafer apparatus of FIG. 1.

Still referring to FIG. 5, each of the blades 40 has a cutting edge 60. In the illustrated embodiment, the cutting edge 60 is a linear straight cutting edge; although other embodiments may include other cutting edge configurations, such as a scalloped cutting edge, for example. The cutting edge 60 has a length L (FIG. 6). The length L of the cutting edge 60 is generally defined between first and second ends 76, 78 (FIG. 5) of the blade 40. Preferably, the length L of the cutting edge 60 is between 10 and 30 inches; more preferably between about 12 and 16 inches.

Referring now to FIG. 6, the length L of the cutting edge 60 extends a majority of a height H of the housing opening 60 of the deleafer apparatus 10. In operation, the cutting edge 60 sweeps across the housing opening 30 in an arcuate path to strip the leaves from any vines drawn or extending into the openings 28 of the drum 24. Accordingly, the length L of the cutting edge 60 extends a substantial majority of the sidewall 26 of the drum 24 such that the areas of all the openings 28 in the sidewall 26 are swept by the arcuate path of the cutting edge 60.

Referring back to FIG. 5, the drive shaft 58 of the deleafer apparatus 10 rigidly couples between the upper plate 42 of the blade assembly 18 and the motor 46. The drive shaft 58 transfers rotational power from the motor 46 to the blade assembly 18. First and second bearing assemblies 134, 136, are mounted at the drive shaft 58 between the blade assembly 18 and the motor 46. As shown in FIGS. 5 and 6, each of the bearing assemblies 134, 136 has a bearing 137, 139 and a mounting flange 138, 140 that couples respectively to top and bottom sides of a base plate 142 of the intermediary bracket 104. The bearing assemblies 134, 136 support and permit rotation of the drive shaft 58.

The motor 46 of the deleafer apparatus 10 also mounts to the intermediary bracket 104. In the illustrated embodiment of FIG. 1, a flexible motor mounting 144 is provided to accommodate stresses and loading experienced during operation of the deleafer apparatus. The flexible motor mounting, shown in FIG. 5, includes a motor bracket 146 having a mounting flange 148 made of rubber to isolate the motor 46 from operational stresses and loads. The motor bracket 146 couples to the rubber mounting flange 148, and the rubber mounting flange 148 couples to the intermediary bracket 104 (FIGS. 1 and 3). When assembled, the motor 46 aligns with the drive shaft 58, which defines the axis of rotation A. In the illustrated embodiment, a coupler 150 (FIG. 5) is used to couple an output shaft 152 of the motor 46 to the drive shaft 58.

As previously discussed, the drum assembly 14 also couples to the drive shaft 58 via the bearing 56. The bearing 56 permits the drum assembly to rotate freely or independently of the drive shaft 58 and the motor 46. Friction, however, is inherent in any bearing. Therefore, bearing friction created by rotation between the drive shaft 58 and the drum assembly 14 may cause consequential rotation of the drum 24. Consequential rotation is drum 24 rotation caused by something other than engagement with the vines, such as bearing friction.

Referring to FIG. 3, to ensure that the drum 24 rotates "freely" or independently (i.e., without provocation from the drive shaft 58), a braking device 154 is mounted to the drum assembly 14. The braking device 154 includes a brake drum 156 rigidly coupled to the drum 24, and a braking band 158, such as a rubber strap. The braking band 158 is coupled to the intermediary bracket 104 and is wrapped around the brake drum 156 to provide a braking force that brakes or prevents consequential rotation of the drum 24. The braking force generated by the braking device 154 is sufficient enough to counteract any consequential rotation of the drum 24, but still allow "free" rotation of the drum 24 when engaged with the vines. In other words, the drag or frictional force of the braking band 158 on the brake drum 156 is great enough to prevent consequential drum rotation but not so great as to inhibit free rotation of the drum 24 when the drum assembly 14 is engaged with the vines 7.

Still referring to FIG. 5, the air circulation device 16 of the deleafer apparatus 10 includes a fan 62 and a fan motor 64. The fan 62 and fan motor 64 are mounted at a location beneath the drum 24, i.e., adjacent a lower region 66 (FIG. 2) of the drum assembly 14, by a fan mount bracket 68. The fan mount bracket 68 includes feet or skid guards 88. The skid guards 88 protect the fan motor 64 from contacting the ground G (see FIGS. 7 and 9), which may otherwise damage the fan motor 64. The fan mount bracket 68 mounts to a flange 70 (FIGS. 1 and 2) located on the drum housing 22 of the frame assembly 12. In particular, fasteners (not shown) are inserted into through holes 72, 74 formed in each of the flange 70 and the fan mount bracket 68 to secure the air circulation device 16 relative to the drum assembly 14.

In the illustrated embodiment, the fan motor 64 is a variable speed motor that allows an operator to vary the speed of the fan 62. Typically, the air circulation device 16 has a rating of between about 5 hp and 20 hp; although other sized and rated air circulation devices can be used according to the principles disclosed. In addition, the air circulation device 16 can include a load adapter 132 to dampen the axial and torsional loads acting on the motor 64 during operation of the deleafer apparatus 10.

In an alternative embodiment, the fan 62 can be operated in unison with the blade assembly 18. That is, the motor 46 that rotationally powers the blade assembly 18 can also be arranged to rotationally power the fan 62. In the illustrated embodiment, however, the operator is permitted to adjust or vary the speed of the fan 62 relative to the rotational speed of the blade assembly 18. Thus, the fan speed can be adjusted to a lower speed in applications where less air draw or suction is required to draw in foliage having lighter or more compliant leaf and stem structure. Likewise, the fan speed can be adjusted to a higher speed in applications where more air draw is required to draw in foliage having heavier and less compliant leaf and stem structure.

As previously described, during operation, the deleafer apparatus 10 moves in a direction of travel T along the row of vines while maintaining the orientation of the housing opening 30 and the exposed face 80 of the drum assembly 14 relative to the row of vines. The speed of travel of the transport 5 and the deleafer apparatus 10 relative to the plants or vines 7 is dependent upon a number of factors, such as the speed at which the blade assembly effectively strips the leaves, the efficiency of the air circulation device, the desired percentage of leave removal, and the type of leaves being stripped.

Prior to operation, the operator determines the depth at which the deleafer should engage the vines. The selected depth of engagement corresponds to the percentage of foliage removal desired. The air circulation device 16 is accordingly operated at a selected speed to assist in drawing the leaves and stems of the vines through the housing opening 30 of the deleafer apparatus 10 and through the openings 28 of the drum 24.

As the deleafer apparatus 10 moves along the row of vines, the rods 38 engage the plants to so that the drum 24 walks or rotates in a counterclockwise direction when the deleafer apparatus move in the direction of travel T. The leaves and stems of the vines are fed and drawn into the interior volume V of the drum 24 by engagement of the exposed face 80 and by air flow generated by the air circulation device 16. The motor 46 rotates the blade assembly 18 so that the blades 40 sweep across the arcuate exposed face 80 of the drum assembly 14. In the illustrated embodiment, the blade assembly 18 rotates in a clockwise direction opposite the rotation of the drum assembly 14. The cutting edges 60 of the blades strip the leaves and stems from the portions of the vines extending into the interior volume V of the drum 24. The leaves are expelled or discharged out the bottom of the deleafer apparatus 10. Operation of the air circulation device 16 assists not only in drawing leaves into the interior volume V of the drum 24, but also in discharging the stripped leaves through the open bottom portion 36 of the drum assembly 14.

The above specification provides a complete description of the present invention. Since many embodiments of the invention can be made without departing from the spirit and scope of the invention, certain aspects of the invention reside in the claims hereinafter appended.

What is claimed is:

1. A deleafer apparatus, comprising:
    a frame including a drum housing that defines a housing opening;
    a drum mounted to the frame, the drum having a sidewall that defines an interior volume, the sidewall including a plurality of openings;
    a blade assembly mounted within the interior volume of the drum, the blade assembly being configured to rotate about a vertical axis of rotation; and
    an air circulation device located relative to the drum to draw air through the openings in the sidewall of the drum;
    wherein the drum housing surrounds a majority of the sidewall of the drum so that air flow generated by the air circulation device is directed primarily through the housing opening.

2. The deleafer apparatus of claim 1, wherein the drum is rotatably mounted to the frame.

3. The deleafer apparatus of claim 2, wherein the drum is configured to freely rotate independent of the blade assembly.

4. The deleafer apparatus of claim 1, wherein the blade assembly includes blades arranged to sweep across the housing opening.

5. The deleafer apparatus of claim 1, wherein the blade assembly includes a plurality of blades, each of the blades including a cutting edge having a length, the length of the cutting edge extending generally parallel to the axis of rotation.

6. The deleafer apparatus of claim 1, wherein the air circulation device is located beneath the blade assembly.

7. A deleafer apparatus for removing leaves from a plant, the deleafer apparatus comprising:
    a drum having a plurality of openings located at a circumference of the drum, the drum defining a central volume;
    an air circulating device mounted beneath the central volume of the drum;
    a rotating blade assembly mounted in relation to the drum;
    a housing defining a housing opening, the housing being arranged to wrap around a majority of the circumference of the drum so that a flow of air generated by the air circulation device is directed through the housing opening of the housing and through an exposed number of the openings in the drum;
    wherein the rotating blade assembly strips leaves that are drawn into the central volume of the drum by the flow of air.

8. The deleafer apparatus of claim 7, wherein the rotating blade assembly is located within the central volume of the drum.

9. The deleafer apparatus of claim 8, wherein the rotating blade assembly includes a number of blades having cutting edges, the blades being arranged such that the cutting edges of the blades sweep across the housing opening.

10. The deleafer apparatus of claim 9, wherein the cutting edges of the blades sweep across the housing opening in an arcuate path.

11. The deleafer apparatus of claim 9, wherein each of the drum and the rotating blade assembly rotate about an axis of rotation, the rotating blade assembly being arranged to rotate independently of the drum.

12. The deleafer apparatus of claim 7, wherein the housing opening has a height, and wherein the rotating blade assembly includes a blade having a length, the length of the blade extending a majority of the height of the housing opening.

13. The deleafer apparatus of claim 7, wherein a portion of the drum defines an exposed face that engages the plant, the exposed face extending a distance outward from the housing opening of the housing.

14. A deleafer apparatus for removing leaves from plants, the deleafer apparatus comprising:
    a frame including a housing having a housing opening;
    a drum rotatably mounted to the frame, the drum having a sidewall that defines a plurality of openings, the sidewall including a face that contacts plants during operation;
    a blade assembly having blades that remove leaves from the plants; and
    an air circulation device located relative to the drum to draw the leaves of the plants through the openings in the sidewall of the drum;
    wherein the housing opening of the frame defines the face of the sidewall that contacts the plants during operation, the housing surrounding a majority of the sidewall of the drum so that air flow generated by the air circulation device is directed primarily through the housing opening, and wherein the drum rotates during operation such that the face of the drum sidewall is substantially stationary relative to a point of engagement with the plants as the deleafer apparatus travels relative to the plants.

15. The deleafer apparatus of claim 14, wherein the drum is configured to freely rotate.

16. The deleafer apparatus of claim 14, wherein the air circulation device is located beneath the drum.

17. The deleafer apparatus of claim 14, wherein the air circulation device expels leaves out the bottom of the drum.

18. The deleafer apparatus of claim 14, wherein the blade assembly is mounted within the interior volume of the drum.

19. The deleafer apparatus of claim 14, wherein the blades of the blade assembly are spaced apart moving blades.

20. The deleafer apparatus of claim 19, further including a motor that actuates the spaced apart blades.

21. The deleafer apparatus of claim 20, wherein the motor of the blade assembly actuates the blades such that the spaced apart blades revolve about a vertical axis.

22. A deleafer apparatus for removing leaves from a plant, the deleafer apparatus comprising:
    a drum having a circumference and a central volume, the drum including a plurality of openings located at the circumference of the drum;
    an air circulating device mounted beneath the central volume of the drum;

a blade assembly mounted in relation to the drum; and a housing defining a housing opening, the housing being arranged to wrap around a majority of the circumference of the drum so that a flow of air generated by the air circulation device is directed through the housing opening of the housing and through an exposed number of the openings in the drum;

wherein the air circulating device expels leaves removed by the blade assembly through a bottom of the drum.

23. The deleafer apparatus of claim 22, wherein the drum rotates such that a face of the drum remains substantially stationary relative to engagement with the plants as the apparatus moves relative to the plants.

24. The deleafer apparatus of claim 23, wherein a portion of the drum defines an exposed face that engages the plant, the exposed face extending a distance outward from the housing opening of the housing.

25. The deleafer apparatus of claim 23, wherein the drum is configured to freely rotate.

26. The deleafer apparatus of claim 22, wherein the blade assembly is mounted within the central volume of the drum.

27. The deleafer apparatus of claim 22, wherein the blade assembly includes spaced apart moving blades.

28. The deleafer apparatus of claim 27, further including a motor that actuates the spaced apart blades.

29. The deleafer apparatus of claim 28, wherein the motor of the blade assembly actuates the blades such that the spaced apart blades revolve about a vertical axis.

30. A deleafer apparatus for removing leaves from plants, the deleafer apparatus comprising:

a frame;

a drum rotatably mounted to the frame, the drum having a sidewall that defines a plurality of openings, the sidewall including a face that contacts plants during operation;

a blade assembly having spaced apart moving blades that remove leaves from the plants, and a motor that actuates the spaced apart blades; and an air circulation device located relative to the drum to draw the leaves of the plants through the openings in the sidewall of the drum;

wherein the drum rotates during operation such that the face of the drum sidewall is substantially stationary relative to a point of engagement with the plants as the deleafer apparatus travels relative to the plants.

31. The deleafer apparatus of claim 30, wherein the motor of the blade assembly actuates the blades such that the spaced apart blades revolve about an axis.

32. The deleafer apparatus of claim 31, wherein the spaced apart blades revolve about a vertical axis.

33. The deleafer apparatus of claim 30, wherein the drum is configured to freely rotate.

34. The deleafer apparatus of claim 30, wherein the frame includes a housing having a housing opening, the housing opening defining the face of the sidewall that contacts the plants during operation.

35. The deleafer apparatus of claim 34, wherein the housing surrounds a majority of the sidewall of the drum so that air flow generated by the air circulation device is directed primarily through the housing opening.

36. The deleafer apparatus of claim 30, wherein the air circulation device is located beneath the drum.

37. The deleafer apparatus of claim 30, wherein the air circulation device expels leaves out the bottom of the drum.

38. The deleafer apparatus of claim 30, wherein the blade assembly is mounted within the interior volume of the drum.

* * * * *